United States Patent Office 2,803,610
Patented Aug. 20, 1957

2,803,610

HEAT-RESISTANT FINISH COMPOSITIONS AND VEHICLES THEREFOR

Bernard H. Kress, Toledo, Ohio, assignor, by mesne assignments, to Allied Chemical & Dye Corporation, New York, N. Y., a corporation of New York No Drawing. Application May 8, 1953, Serial No. 353,922

8 Claims. (Cl. 260—24)

This invention relates to high temperature finishes and a vehicle therefor. More specifically, the invention relates to a coating resin or vehicle comprising a resin ester of a polyhydric alcohol and a specific type of organosilanol, which vehicle is of the type suited for metallic or other leafing pigments for the production of finishes for use under service temperatures beyond those of ordinary organic vehicles and also under exposure to chemicals, weather, and other deleterious influences.

The organic vehicles previously known have been suitable for use at maximum service temperatures of only 300° C. Silicone resin vehicles which resist temperatures well beyond those of the organic vehicles have not proven feasible except for applications where high baking or curing temperatures may be employed. In addition the presently known silicone vehicles are deficient as coating resins in other respects. Silicone-modified organic coating resins have not proven resistant to temperatures in excess of 600 to 800° F. in continuous service. There exists a need, therefore, for a heat resistant finish, and a vehicle therefor, for service in the temperature range of 800 to 1500° F. or more.

The principal object of the invention, therefore, is to provide novel finishes and vehicles therefor which are resistant to high temperatures.

Another important object of the invention is to provide high temperature finishes and vehicles therefor, which finishes are not only resistant to high temperatures but which also are resistant to chemicals, weather, solvents and other deleterious influences.

More specific objects and advantages are apparent from the following description, which illustrates and discloses but is not intended to limit the scope of the invention.

The present invention is based upon the discovery that a certain type of organosilanol is compatible with a resinous rosin ester of a polyhydric alcohol, a solution of these substances forming a novel vehicle for high temperature-, chemical- and weather-resistant finishes of the inorganic or metal leaf or powder pigmented types. Such a vehicle improves the leafing action of the leafing pigment and forms a finish having excellent resistance to temperatures as high as 1000 to 1500° F. and also having excellent weather-, chemical- and solvent-resistance. The vehicle or finish dries at room temperature to form a coating tightly adherent to metals, wood, plastics, glass, ceramics and others, and which is resistant to weather and chemicals. Upon baking or exposure to high service temperatures the finish bakes to an insoluble, tightly-adherent coating suitable for rigorous service. Automobile, tractor, and airplane engine parts and exhaust systems painted with the metal-pigmented finish remain bright and free from rust or other forms of attack. Chemical process equipment likewise is protected by the finish against high temperatures and against corrosion and weathering.

A high temperature finish composition embodying the invention comprises a dispersion of an inorganic, heat-resistant leafing-type pigment in a vehicle comprising a solution, in a volatile, inert organic solvent of (1) a rosin ester of a polyhydric alcohol, (2) an acidic, low molecular weight organosilanol wherein there are at least 2.5 silicon-bonded oxygen atoms per silicon atom, including at least 0.15 silicon-bonded oxygen atoms per silicon atom that are contained in hydroxyl groups; at least 70 percent of the silicon atoms have hydrocarbon substituents attached thereto; and at least one-third of said hydrocarbon substituents are aryl groups.

ORGANOSILANOL

The term "organosilanol," as used herein, includes an organosilanol that has been condensed with elimination of water. Most organosilanols, especially those derived from trifunctional silanes, are more or less condensed, although in this invention the organosilanol is only slightly condensed in order to have the low molecular weight and acidity necessary for compatibility with the rosin ester component.

In general, the organosilanol must be below 3000 in molecular weight in order to be compatible with the rosin ester component. There is no lower limit on molecular weight as far as compatibility is concerned. The compatibility of the organosilanol with the rosin ester improves with increases in the hydroxyl content of the former; in general, organosilanols having a hydroxyl/silicon ratio below about 0.15 are not compatible with the rosin ester. It is preferred to utilize silanols having a hydroxyl/silicon ratio (H value) of at least 0.30. Best results are obtained with silanols derived from silane compositions consisting essentially of phenyl trifunctional silanes and having a hydroxyl/silicon ratio of at least 0.40. By suitable hydrolysis phenyl trifunctional silanes can be converted to preferred silanols containing from 4.5 to 12.5% by weight of hydroxyl.

The present organosilanol is obtained by the hydrolysis of an organosilane composition comprising a hydrolyzable organosilane (one or more of which is used) whose molecule consists of a silicon atom to which are attached four monovalent groups, at least one of which is hydrocarbon group attached by a carbon-silicon bond, such as an aryl group, an aliphatic group, an aralkyl group, an alkenyl group, a cycloalkyl group, and others, from two to three of which are hydrolyzable groups and not more than one of which is hydrogen. At least one-third and preferably two-thirds of the hydrocarbon groups attached to silicon in the organosilane molecule are aryl groups.

"Hydrolyzable group," as used herein, means a halo, alkoxy, acyloxy, amino, aroxy, or other group which is labile under the acidic hydrolysis conditions employed; a hydrogen atom, for example, being a hydrolyzable group under alkaline hydrolysis and ordinarily non-hydrolyzable under acidic hydrolysis. The halo group may be any halogen, although it is generally preferred to utilize those having a molecular weight less than 80, i. e. fluorine, chlorine and bromine. The alkoxy group may be any alkoxy group, although in general it is preferred to utilize any primary or secondary alkoxy group having from one to four carbon atoms. It is preferred to utilize acyloxy silanes in which the acyloxy group is acetyl; aminosilanes in which the amino group is ammonium or other simple, unsubstituted amino group; and aroxysilanes in which the aroxy group is phenol.

It is preferred that the silicon-bonded hydrocarbon groups in the silane be aryl groups containing from one to two benzene nuclei having not more than five nuclear substituents totaling not more than 6 carbon atoms. It is also preferred that aliphatic groups on the silane be primary, secondary or tertiary alkyl groups having from one to twelve carbon atoms. Preferred aralkyl groups are those aliphatic groups, as defined, in which one hydrogen atom has been replaced with an aryl group, as defined. Preferred alkenyl groups are the alpha-beta unsaturated groups such as the vinyl or styryl groups. Preferred cycloalkyl groups contain 5 to 6 ring carbon atoms and a total of not more than 12 carbon atoms.

Examples of hydrolyzable organosilanes that can be utilized include methyltrifluoro- or chloro- or bromo- or methoxy- or ethoxy- or propoxy- or butoxy- or acetoxy- or ammonium- or phenoxy-, dimethyldifluoro- or chloro- or ethoxy-, diethyldichloro-, propyltrifluoro- or chloro- or bromo- or ethoxy-, dipropyldichloro-, dipropyldiethoxy-, butyltrifluoro- or chloro- or ethoxy-, dibutyl diacetoxy-, t-butyltrichloro-, dibutyldibutoxy-, pentyltrichloro-, 2-methylpentyltrichloro-, 3 - (2,2,4 - trimethylpentyl) trichloro-, n-hexyl-trichloro-, octyltrichloro-, lauryl trichloro-, octadecyl-trichloro-, phenyltrifluoro- or chloro- or bromo- or iodo- or methoxy- or ethoxy- or butoxy-, or acetoxy- or phenoxy- or amino-, diphenyldichloro- or ethoxy-, methylphenyldichloro-, ethylphenyldi-chloro-, benzyltrichloro-, phenylbenzyldichloro-, diphenylphenoxychloro-, alpha-naphthyltrifluoro or chloro- or ethoxy-, beta-naphthyltrichloro-, ethyldiethoxychloro-, ethyldichloro-, propyldichloro-, t-butyldichloro-, t-butyldiethoxy-, t - butyldiacetoxy-, beta - phenylethyltrichloro-, allyltrichloro- or ethoxy-, methallyltrichloro- or ethoxy-, vinyltrifluoro- or chloro- or bromo- or ethoxy, vinylphenyltrichloro-, vinylphenyltriethoxy-, cyclohexyltrichloro- or ethoxy-, methylcyclo-hexyltrichloro-, vinylcyclohexyltrichloro, and other silanes.

The preferred organosilane composition comprises mono-organo trifunctional silanes such as phenyltrichlorosilane, phenyltriethoxysilane, ethyltrichlorosilane, vinyltrichlorosilane, vinylphenyltrichlorosilane, and others, in which composition at least 70%, and preferably 90% of the silicon atoms have hydrocarbon groups attached thereto, of which hydrocarbon groups at least one-third, more preferably at least two-thirds are aryl groups. Best results are obtained using organosilane compositions consisting essentially of phenyl trifunctional silanes. In no case should the composition to be hydrolyzed contain any appreciable amount of tri-organo, mono-functional silanes such as triphenylchlorosilane.

The silane composition to be hydrolyzed may contain a small amount of tetrafunctional silanes, such as a silicon tetrahalide, e. g. silicon tetrachloride, or an alkyl orthosilicate, e. g. ethylorthosilicate. However, since at least 70% of the silicon atoms in such a composition must have hydrocarbon groups attached thereto, the tetrafunctional silanes cannot constitute more than 30 mol percent of the silane composition to be hydrolyzed.

In special cases it may be permissible to use a silane composition containing a small amount of silanes having silicon-bonded hydrogen atoms, such as silicochloroform, methyldichlorosilane, ethyldichlorosilane, phenyldichlorosilane and others. Silicochloroform, since it does not contain a hydrocarbon group, can in no case constitute more than 30 mol percent of the silane composition.

A hydrogen atom attached to a silicon atom is resistant to the acidic hydrolysis employed in obtaining the present acidic organosilanols. Such a hydrogen atom, however, is readily removed under basic conditions or by oxidation. In this respect, the use of silanes containing minor amounts of such hydrogen atoms may be advantageous in certain cases, because the potential reactivity of the silicon-bonded hydrogen atoms may be taken advantage of in a resinous coating or film-forming composition to increase the ease and speed of cure. However, for widest applicability it is preferable to use a silane composition containing no appreciable amount of hydrogen atoms attached to silicon atoms. In any case, there must be an average of at least 2.5 hydrolyzable substituents attached to each silicon atom, and at least 70 percent of the silicon atoms must have hydrocarbon substituents attached thereto. Thus, there must be a minimum of 3.2 substituents per silicon atom, leaving 0.8 as the maximum number of silicon-bonded hydrogen atoms per silicon atom in a silane composition to be hydrolyzed to produce an organosilanol for use in the present composition.

In a mixture of hydrolyzable silanes for hydrolysis to produce an organosilanol, the r/Si ratio may be from 0.7 to 1.5, but preferably is from 0.9 to 1.25. ("r/Si ratio" is used herein to indicate the total number of hydrocarbon groups attached to silicon atoms in the molecules of the silanes divided by the total number of silicon atoms.)

The hydrolysis may be conducted by adding the hydrolyzable mixture of silanes to a hydrolyzing solution. The addition should be made at a rate sufficiently slow that the exothermic hydrolysis reaction does not cause local overheating. It is usually desirable, also, that the hydrolyzing solution be stirred during the addition; otherwise, local overheating may result in spite of a slow rate of addition. In any event, the hydrolysis of the hydrolyzable groups should be carried to completion, so as to produce a "completely hydrolyzed" product.

The hydrolyzing agent may be water alone or (in the case of less readily hydrolyzed silanes) an aqueous solution of a mineral acid. Halosilanes are readily hydrolyzed by water alone, and it is often desirable to hydrolyze them with a water-ice slurry; the hydrolysis produces a hydrohalic acid which then serves as a catalyst for further hydrolysis. Amino, acyloxy, aroxy and alkoxy groups are progressively more difficult to hydrolyze, and amino groups are more difficult to hydrolyze than halo groups. It is usually desirable to use a dilute aqueous solution of a mineral acid as the hydrolyzing agent with silanes having hydrolyzable groups which consist of amino, acyloxy or aroxy groups. Alkoxy groups are more difficult to hydrolyze than are any of the other four so that a more drastic hydrolysis reaction is desirable; the more drastic hydrolysis reaction may be provided by a higher temperature, or by use of a stronger aqueous mineral acid solution as the hydrolyzing agent, or by use of little or no solvent (for the silanes), which serves as a diluent. The mineral acids that are used as hydrolysis catalysts include hydrochloric, sulfuric and phosphoric, hydrochloric usually being preferred. The amount of hydrolyzing solution that is used includes at least enough water to effect complete hydrolysis of the silane (i. e., at least one gram mol of water for every two gram atoms of hydrolyzable groups in the silanes to be hydrolyzed). It is usually advantageous to use a considerable excess of water, e. g., from 5 to 10 gram mols for every two gram atoms of hydrolyzable groups, but it is ordinarily not advantageous to use more than about 20 gram mols of water for every two gram atoms of hydrolyzable groups. In all cases the hydrolysis is carried out under acidic conditions (at a pH below 7.0) to produce an acidic organosilanol.

It is usually desirable to dissolve the silanes in an inert solvent and then add the solvent solution of silanes to the hydrolysis medium. In general the hydrocarbon-type solvents such as benzene, xylene, toluene, hexane, octane, and others, which are highly immiscible with water tend to produce silanols too high in molecular weight and too low in hydroxyl content for compatibility. Xylene, for example, tends to produce silanols having a molecular weight above 3000 and frequently above 4000. On the other hand, solvents having greater miscibility with the water medium used for hydrolysis tend to produce silanols of a low or intermediate molecular weight below 3000 and having high hydroxyl/silicon ratios. The miscibility required is of a low order, for example 0.1 to 1.5% or more solubility in water and vice versa, although the latter degree of miscibility is about 10 to 100 times or more that of xylene, for example. Suitable inert solvents include ethers such as diethyl, ethylpropyl, dipropyl and propylbutyl ethers, and cyclic ethers such as dioxane (completely miscible) and others; ketones such as acetone, methylethyl ketone, diethyl ketone, methylpropyl ketone, ethylbutyl ketone and others; alcohols such as methyl, ethyl, propyl and butyl alcohols, and others; carboxylic acid esters such as ethyl acetate, propyl acetate, butyl acetate, amyl acetate, 2-ethylhexyl acetate, ethyl propionate, ethyl butyrate, and others. However, the preferred solvent is an inert organic solvent having a boiling point below 200° C. and above room temperature, that forms a two-phase system with the water of hydrolysis, and which comprises at least 25% by weight of certain aliphatic monocarboxylic acid esters or aliphatic ketones. Hydrocarbon solvents may be present, if desired, such as xylene, benzene, octane, etc. It is preferred that the solvent comprise at least 35% of the ester or ketone solvent.

The preferred solvents include the class of ketones whose molecules have at least five and preferably not more than ten carbon atoms, at least three of which form a chain connected to the carbonyl group: e. g. methyl propyl ketone, methyl isopropyl ketone, methyl butyl ketone, methyl amyl ketone, diisopropyl ketone, ethyl propyl ketone, ethyl isopropyl ketone, ethyl butyl ketone and ethl isobutyl ketone. The preferred ketone solvents are methyl isobutyl ketone and methyl amyl ketone, methyl isobutyl ketone being more desirable because its lower boiling point permits it to be more readily removed if desired.

The aliphatic monocarboxylic acid esters that may be employed include that class of esters which may be considered to be derived by esterification of an aliphatic monohydric alcohol having from 2 to 8 carbon atoms with an aliphatic monocarboxylic acid whose molecule consists of a primary or secondary alkyl radical, having from one to three carbon atoms, whose free valence is connected to a carboxyl group (i. e., acetic acid, propionic acid, isobutyric acid and butyric acid), the total number of carbon atoms in the ester molecule being at least five and not greater than 10. Non-reactive substituents, such as halogen atoms having an atomic weight less than 80, may be present in an aliphatic radical in either the acid or the alcohol.

Such aliphatic monocarboxylic acid esters include: n-propyl acetate, isopropyl acetate, n-butyl acetate, isobutyl acetate, secondary butyl acetate, tertiary butyl acetate, n-amyl acetate, isoamyl acetate, secondary amyl acetates, tertiary amyl acetate, n-hexyl acetate, isohexyl acetate, n-heptyl acetate, 2-ethylhexyl acetate, capryl acetate, ethyl propionate, isopropyl propionate, n-butyl propionate, secondary butyl propionate, isobutyl propionate, n-amyl propionate, isoamyl propionate, ethyl butyrate, n-propyl butyrate, n-butyl butyrate, isobutyl butyrate, n-amyl butyrate, isoamyl butyrate, isobutyl isobutyrate and isoamyl isobutyrate.

The preferred organic solvents are isopropyl acetate and n-butyl acetate, since these solvents not only are readily available but also have boiling points sufficiently low so that they can be rapidly distilled and replaced with other less expensive solvents such as xylene.

It is usually desirable to use a substantial amount of a solvent or solvents (e. g., from about 100 to about 300 ml. of solvents per gram mol of silanes). In some instances (e. g., when the silanes are hydrolyzable only with comparative difficulty) it is desirable to use considerably less solvent, while in still other instances (e. g., when the silanes are particularly easy to hydrolyze) it is desirable to use somewhat more solvent.

It has been found that the hydrolysis is usually substantially complete within from about 5 to about 10 minutes after the addition of the silanes to the hydrolyzing solution has been completed. Apparently, leaving the product in contact with the hydrolyzing solution for longer periods of time has no deleterious effect on the product. In fact, it is usually desirable to continue agitation of the mixture for about 15 to 30 minutes after the addition is complete. The product layer is then allowed to separate from the aqueous phase (e. g., in a separatory funnel) and the aqueous phase is drawn off and extracted with a water-immiscible solvent. This extract is combined with the product. The separated product may be washed with water and dried, preferably by azeotropic distillation of the water along with a portion of the solvent. The product also may be dried over such a drying agent as anhydrous calcium chloride or anhydrous sodium sulfate. Such a drying agent is then removed (e. g., by filtration) from the dried hydrolysis product.

The precautions hereinbefore described should be observed during the hydrolysis of the silanes in order to obtain a completely hydrolyzed product (organosilanol) having a low molecular weight and a high hydroxyl content.

ROSIN ESTER

The term "rosin," as used herein, includes modified forms of rosin, such as polymerized rosin, hydrogenated rosin, and rosinmaleic anhydride adducts. The preferred form of rosin is polymerized rosin.

The polyhydric alcohols whose rosin esters may be employed include glycerol, alkylene glycols in the series from ethylene glycol to decylene glycols, polymethylene glycols in the series from trimethylene to decamethylene glycol, dipropylene glycol, and polyethylene glycols in the series from diethylene to nonaethylene glycol. Higher polyhydric alcohols such as pentaerythritol are preferred.

The rosin esters and the methods of preparing them are well-known. Among the rosin esters that may be used are those which have been modified in the known manner by reaction with a condensation product of formaldehyde and a phenol such as phenol, bis (hydroxyphenyl) dimethylmethanes and p-tertiary butyl phenol.

The amount of rosin or rosin-derivative used in the production of a rosin ester or modified rosin ester is usually at least two-thirds of the weight of all the ingredients. The amount of the polyhydric alcohol preferably is sufficient so that a product having an acid number below 40 can be obtained. The amount of a formaldehydephenol condensation product, if any, is usually from 10 to 20 percent of the weight of all the ingredients.

VEHICLE

The vehicle of this invention comprises a solution in a volatile, inert organic solvent having a boiling point below 200° C. The solvent utilized will vary slightly according to the hydrocarbon groups on the silanol molecules. For compositions embodying silanols from silane compositions containing 50 to 75% or more of aryl groups, aromatic solvents such as xylene, benzene, toluene, etc. are preferred. If at least one-third the silane mixture consists of silanes containing aliphatic groups, an aliphatic hydrocarbon solvent such as mineral spirits, heptane, or an octane may be employed, alone or in combination with the aromatic solvents.

The proportion of solvent is simply that proportion which gives a viscosity suitable for the method of applying the finish. The proportion of solvent is usually from 30 to 70% by weight, and preferably from 40 to 60%. The weight ratio of rosin ester to organosilanol may be from 4:1 to 1:4, and preferably from 3:2 to 2:3.

The rosin ester and organosilanol ingredients of the finish and vehicle of this invention are truly compatible only under substantially anhydrous conditions, although the compatibility seems unaffected by amounts of water below about 0.5% of the total weight of solution. Greater amounts of water seem to cause separation into two separate phases which make the vehicle or finish unsatisfactory.

In the finish of the present invention in has been found that inorganic, heat-resistant leafing type pigments are required for high temperature service. It has also been found, in general, that higher proportions of such pigments are required than in finishes containing the same pigment and an organic resin vehicle for lower temperature service. For example, with the metal flake pigments such as aluminum, bronze, copper, tin, nickel, stainless steel, zinc, silver, heat-treated base metals and others, about twice the normal metal/resin ratios are required for satisfactory coatings and especially to withstand high temperatures. In general, this means that the metal/resin ratio should be in the range of 1:3 to 3:1. More preferred is the range of 1:2 to 2:1. Best results are obtained with aluminum flake when the ratio is 1:1. A non-metallic leafing pigment which may be used in graphite flake.

The vehicle of this invention appears to have unique leafing properties when utilized with inorganic or metallic leafing pigments. As pointed out above, higher pigment/resin ratios may be utilized without detracting from the quality of the coating. In addition, the coating is smoother and more continuous than ordinary metal-containing finishes. It is the superior leafing properties of the vehicle which is believed at least partially responsible for the weather, chemicals and solvent resistance of the finish. It is also believed that the vehicle decomposes, at least partially, at a slow and controlled rate when exposed to temperatures of 800 to 1000° F. or more without loosening or disturbing the individual pigment flakes. If the vehicle decomposes, it is believed, the residue, if any, still functions as a binder for the pigment. This may explain the extraordinary resistance to deleterious influences shown by the coatings of the finish of this invention.

Example 1

Phenyltrichlorosilane (320 grams) is mixed with butyl acetate (130 ml.) and xylene (190 ml.). The resulting solution is added dropwise with stirring to water (1750 ml.) which is cooled by means of glass coils through which is pumped a Dry Ice-cooled mixture of ethylene glycol and water. The rate of addition is controlled so that the temperature of the reaction mixture is maintained at 0 to 10° C. When the addition is complete, stirring of the mixture is continued for about 15 minutes without further cooling. The mixture is then permitted to separate into two layers (in a separatory funnel). The water layer is withdrawn and the xylene-butyl acetate layer is washed with water (2 portions of 350 ml. each). Thereafter the water layer is separated in a separatory funnel. The molecular weight of this siloxanol is found to be about 2300.

A large sample (336 grams) of the product solution is mixed with a resin solution prepared as follows: Polymerized rosin (134 grams), pentaerythritol (15 grams) and calcium acetate (6.8 grams) are heated in a flask fitted with a condenser and an inlet tube through which a moderate stream of carbon dioxide is passed over the surface of the reaction mixture, at a temperature of 275° C. until the acid number is between 10 and 20. Xylene is added to the resulting resin to dilute the resin to a 50 percent solids concentration. The two solutions are completely compatible.

The resulting coating composition is an excellent vehicle for leafing pigments such as aluminum. When pigmented with aluminum paste in equal proportions, based on the resin, it produces coatings that are highly resistant to temperatures of 1000 to 1500° F. The coatings may be air-dried or baked. In either case they are highly durable and weather-resistant when used outdoors, for example on smoke stacks or automobile exhaust pipes.

Example 2

An organosilanol solution is prepared by the procedure of Example 1, except that the solvent used for hydrolysis consists of 320 ml. of butyl acetate. A sample of the resulting solution is mixed with an equal weight of a solution prepared as follows: Gum rosin (271 grams) and glycerol (29 grams) are heated in the apparatus described in Example 1 at a temperature of 270° C. until the acid number is between 4 and 8, and the cooled product is diluted with xylene to a solids content of 40 percent.

A drawdown of the mixed solution on a glass slide, heated for 10 minutes at 350° F., gives a clear film, indicating complete compatibility.

Example 3

The results are the same as in Example 2 when the second solution is prepared as follows: the product of the condensation of 51% aqueous formaldehyde (357 grams), phenol (159 grams) and p-tertiary butyl phenol (85 grams) in the presence of zinc oxide (17 grams) is heated with gum rosin (2176 grams) and glycerol (207 grams), in the apparatus described in Example 1 at a temperature of 250° C. until the acid number is between 10 and 20, and the cooled product is diluted with xylene to a solids content of 40 percent.

In the foregoing examples, other hydrolyzable organosilanes may be used as hereinbefore described. For example, half of the phenyltrichlorosilane may be replaced by an equal weight of ethyltrichlorosilane.

I claim:

1. A heat-resistant finish composition comprising an inorganic, heat-resistant leafing-type pigment dispersed in a solution, in a volatile, inert organic solvent having a boiling point below 200° C. and of the group consisting of aliphatic and aromatic solvents of (1) a rosin ester of a polyhydric alcohol, and (2) an acidic organosilanol having a molecular weight below 3000 wherein there are at least 2.5 silicon-bonded oxygen atoms per silicon atom, including at least 0.15 silicon-bonded oxygen atoms per silicon atom that are contained in hydroxyl groups; at least 70 percent of the silicon atoms have hydrocarbon substituents attached thereto; and at least one-third of said hydrocarbon substituents are aryl groups; the weight ratio of (1) to (2) being from 4:1 to 1:4.

2. A heat-resistant finish composition comprising a heat-resistant, metallic leafing-type pigment dispersed in a solution, in a volatile, inert organic solvent having a boiling point below 200° C. and of the group consisting of aliphatic and aromatic solvents of (1) a rosin ester of a polyhydric alcohol, and (2) an acidic organosilanol having a molecular weight below 3000, a hydroxyl/silicon ratio of at least 0.25, an r/Si ratio of 0.7 to 1.5, and wherein at least 70 percent of the silicon atoms have hydrocarbon substituents attached thereto, at least two-thirds of which are aryl groups, and no substantial number of silicon atoms having more than two hydrocarbon groups attached thereto; the weight ratio of (1) to (2) being from 4:1 to 1:4.

3. A heat-resistant finish composition comprising an aluminum leafing-type pigment dispersed in a solution, in a volatile, inert organic solvent having a boiling point below 200° C. and of the group consisting of aliphatic and aromatic solvents of (1) a rosin ester of polymerized rosin and a polyhydric alcohol, and (2) an acidic organosilanol having a molecular weight below 3000, a hydroxyl/silicon ratio of at least 0.35, wherein at least 90 percent of the silicon groups have phenyl groups attached thereto, and wherein no substantial number of silicon atoms have more than two phenyl groups attached thereto; the weight ratio of (1) to (2) being from 4:1 to 1:4.

4. A heat-resistant finish composition as claimed in claim 3 wherein the polyhydric alcohol is pentaerythritol.

5. A vehicle for inorganic, heat-resistant leafing-type pigments in the production of coatings that are resistant to high temperatures, comprising a solution, in a volatile, inert organic solvent having a boiling point below 200° C. and of the group consisting of aliphatic and aromatic solvents of (1) a rosin ester of a polyhydric alcohol and (2) an acidic organosilanol having a molecular weight below 3000, a hydroxyl/silicon ratio of at least 0.15, and wherein there are a total of at least 2.5 silicon-bonded oxygen atoms per silicon atom; at least 70 percent of the silicon atoms have hydrocarbon substituents attached thereto; and at least one-third of said hydrocarbon substituents are aryl groups; the weight ratio of (1) to (2) being from 4:1 to 1:4.

6. A vehicle for metallic, heat-resistant leafing-type pigments in the production of coatings that are resistant to high temperatures, comprising a solution, in a volatile, inert organic solvent having a boiling point below 200° C. and of the group consisting of aliphatic and aromatic solvents of (1) a resinous ester of rosin and a polyhydric alcohol and (2) an acidic organosilanol having a molecular weight below 3000, a hydroxyl/silicon ratio of at least 0.25, an r/Si ratio of 0.7 to 1.5, and wherein at least 70 percent of the silicon atoms have hydrocarbon substituents attached thereto, of which at least two-thirds are aryl groups; the weight ratio of (1) to (2) being from 4:1 to 1:4.

7. A vehicle for aluminum leafing-type pigments in the production of coatings that are resistant to high temperatures, comprising a solution in a volatile, inert organic solvent having a boiling point below 200° C. and of the group consisting of aliphatic and aromatic solvents of (1) a resinous ester of polymerized rosin and pentaerythritol and (2) an acidic organosilanol having a molecular weight below 3000, a hydroxyl/silicon ratio of at least 0.35, an r/Si ratio of 0.90 to 1.25, and wherein at least 70 percent of the silicon atoms have hydrocarbon substituents attached thereto, of which at least two-thirds are phenyl groups; the weight ratio of (1) to (2) being from 4:1 to 1:4.

8. A vehicle for aluminum leafing-type pigments in the production of coatings that are resistant to high temperatures, comprising a solution in a volatile, inert organic solvent having a boiling point below 200° C. and of the group consisting of aliphatic and aromatic solvents of (1) a resinous ester of polymerized rosin and pentaerythritol and (2) an acidic organosilanol having a molecular weight below 3000; a hydroxyl/silicon ratio of at least 0.35; wherein at least 90 percent of the silicon atoms have phenyl groups attached thereto; and wherein no substantial number of silicon atoms have more than two phenyl groups attached thereto; the weight ratio of (1) to (2) being from 4:1 to 1:4.

References Cited in the file of this patent
UNITED STATES PATENTS

| | | |
|---|---|---|
| 2,344,194 | Anderson | Mar. 14, 1944 |
| 2,495,306 | Zurcher | Jan. 24, 1950 |
| 2,527,793 | Bump et al. | Oct. 31, 1950 |
| 2,605,194 | Smith | July 29, 1952 |
| 2,607,755 | Bunnell | Aug. 19, 1952 |